us011017746B2

(12) United States Patent
Seethaler et al.

(10) Patent No.: US 11,017,746 B2
(45) Date of Patent: May 25, 2021

(54) AUXILIARY DISPLAY SCALING FACTOR

(71) Applicant: Lenovo (Singapore) Pte. Ltd., Singapore (SG)

(72) Inventors: Kenneth Scott Seethaler, Wake Forest, NC (US); Adam Jerome Cavenaugh, Cary, NC (US); Hidetoshi Mori, Kanagawa-ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/369,041

(22) Filed: Mar. 29, 2019

(65) Prior Publication Data

US 2020/0312281 A1 Oct. 1, 2020

(51) Int. Cl.
*G09G 5/373* (2006.01)
*G06F 1/16* (2006.01)
*G06F 3/14* (2006.01)

(52) U.S. Cl.
CPC ............. *G09G 5/373* (2013.01); *G06F 1/165* (2013.01); *G06F 3/1431* (2013.01); *G09G 2340/0407* (2013.01); *G09G 2340/0464* (2013.01)

(58) Field of Classification Search
None
See application file for complete search history.

(56) References Cited

U.S. PATENT DOCUMENTS

2014/0089821 A1* 3/2014 Rios, III ................. G06F 3/14
715/761
2018/0032203 A1* 2/2018 Sepulveda ............ G06F 3/0416

* cited by examiner

*Primary Examiner* — Stephen T. Reed
(74) *Attorney, Agent, or Firm* — Ference & Associates LLC

(57) ABSTRACT

One embodiment provides a method, including: displaying, on a primary display of an information handling device, an object having a predetermined size; adjusting, based on user input, a position of the object from the primary display to an auxiliary display; and maintaining, based on a scaling factor applied to the auxiliary display, the predetermined size of the object on the auxiliary display. Other aspects are described and claimed.

16 Claims, 4 Drawing Sheets

AUXILIARY DISPLAY SCALING FACTOR

BACKGROUND

Advances in technology have enabled content to be transferred between two or more connected display devices. More particularly, modern information handling devices ("devices"), for example laptops and/or personal computers, smartphones, tablets, hybrid devices, other clamshell devices, and the like may comprise two or more integrated or operatively coupled display screens. A user may transfer content (e.g., an application window, etc.) from one display screen to another by manually dragging the content using a finger or stylus, wirelessly transmitting the content, etc.

BRIEF SUMMARY

In summary, one aspect provides a method, comprising: displaying, on a primary display of an information handling device, an object having a predetermined size; adjusting, based on user input, a position of the object from the primary display to an auxiliary display; and maintaining, based on a scaling factor applied to the auxiliary display, the predetermined size of the object on the auxiliary display.

Another aspect provides an information handling device, comprising: a primary display; an auxiliary display operatively coupled to the information handling device; a processor; a memory device that stores instructions executable by the processor to: display, on the primary display, an object having a predetermined size; adjust, based on user input, a position of the object from the primary display to the auxiliary display; and maintain, based on a scaling factor applied to the auxiliary display, the predetermined size of the object on the auxiliary display.

A further aspect provides a product, comprising: a storage device that stores code, the code being executable by a processor and comprising: code that displays, on a primary display, an object having a predetermined size; code that adjusts, based on user input, a position of the object from the primary display to an auxiliary display; and code that maintains, based on a scaling factor applied to the auxiliary display, the predetermined size of the object on the auxiliary display.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
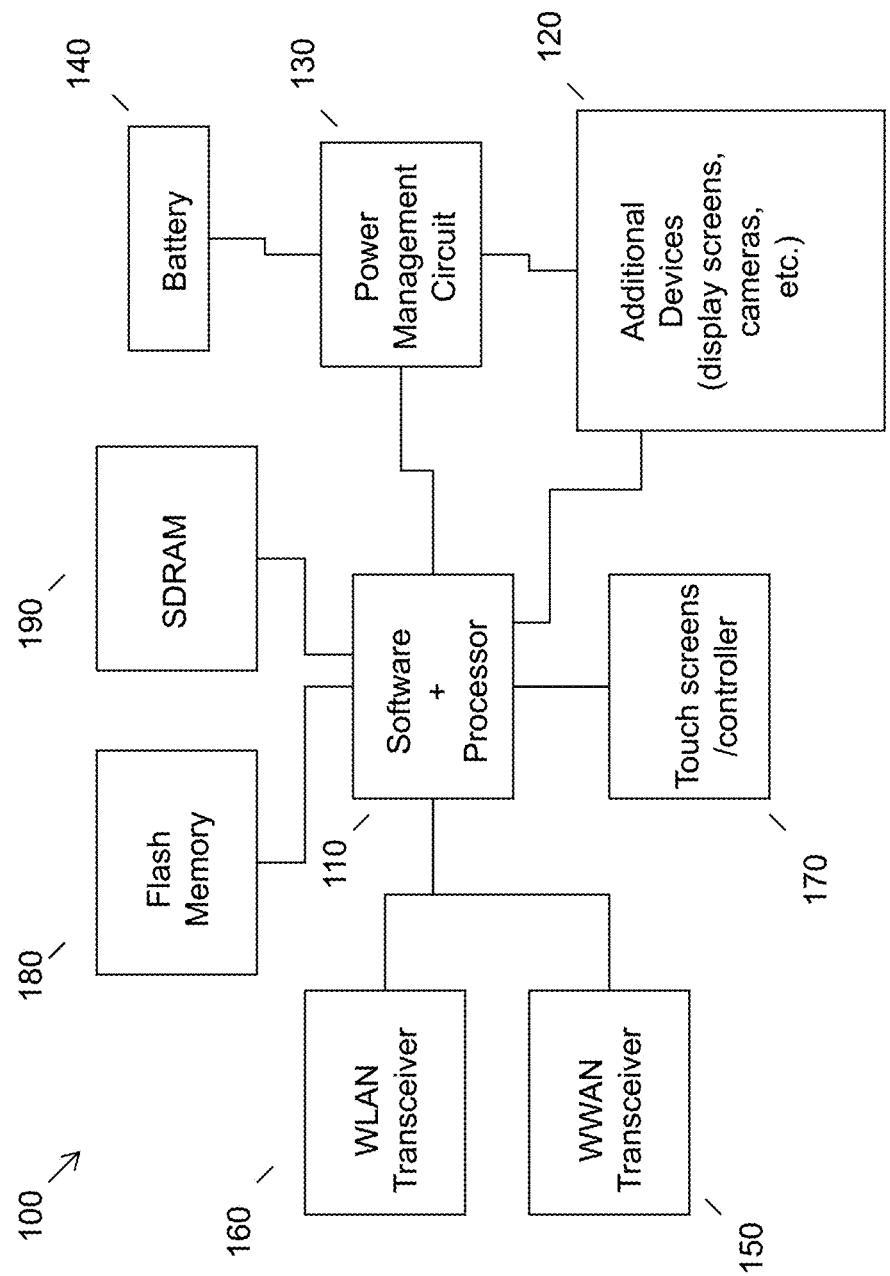
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment.

Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

One popular implementation of a multi-display system is a two monitor setup where the monitors are positioned next to each other and a user may drag content from one monitor to the next using a mouse or stylus. Another implementation of a multi-display system corresponds to a situation where a user may wirelessly transmit, or cast, content from one display device (e.g., a smartphone, laptop, etc.) to another display device (e.g., a smart TV, a laptop, etc.). In yet another implementation of a multi-display system, a singular device may comprise two or more integrated display devices (e.g., located on different portions of the device, etc.) that a user may transfer content between.

Generally, one of the display devices in the multi-display system is a primary display and the other device is an auxiliary display. More particularly, the primary display may correspond to the display device that is larger than the auxiliary display and/or may correspond to the display device that newly opened content (e.g., application windows, etc.) is designated to and/or originally displayed upon. Situations often arise where the primary display and an auxiliary display do not share the same physical size, screen resolution or PPI (pixels per inch). In these situations, transferred content between the display devices may appear differently on one device than it appears on the other (e.g., an application window may appear larger or smaller on the destination screen after transfer, etc.).

Existing solutions allow users to perform some independent scaling functions for content displayed on each screen. Stated differently, a user may be able to navigate through a series of menus to try and physically match the size of the content on each display device. However, such a method may be burdensome and may also be very time-consuming and frustrating to a user who is not familiar with how to perform the manual scaling process. Additionally there is no current way to obtain the exact scaling factor so that a window in the primary display has the same physical size when it is transferred to the auxiliary display. Furthermore, the scaling on the auxiliary display will not automatically scale based upon the scaling present on the main display.

Accordingly, an embodiment provides a method for automatically applying a scaling factor to an auxiliary display so that an object displayed in an auxiliary display may appear the same physical size as the object displayed in the primary display. In an embodiment, an object may be displayed on a primary display screen of a device. An embodiment may then adjust a position of the object (e.g., responsive to receiving user adjustment input, etc.) from the primary display to an auxiliary display screen integrally or operatively connected to the device. The primary display and auxiliary display may have different sizes, resolutions, etc. An embodiment may automatically apply a scaling factor to an auxiliary display to maintain the original size of the object from the primary display. Such a method may allow objects transferred between display devices to maintain some or all of their dimensional properties.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., one or more operatively or integrally connected display devices, an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
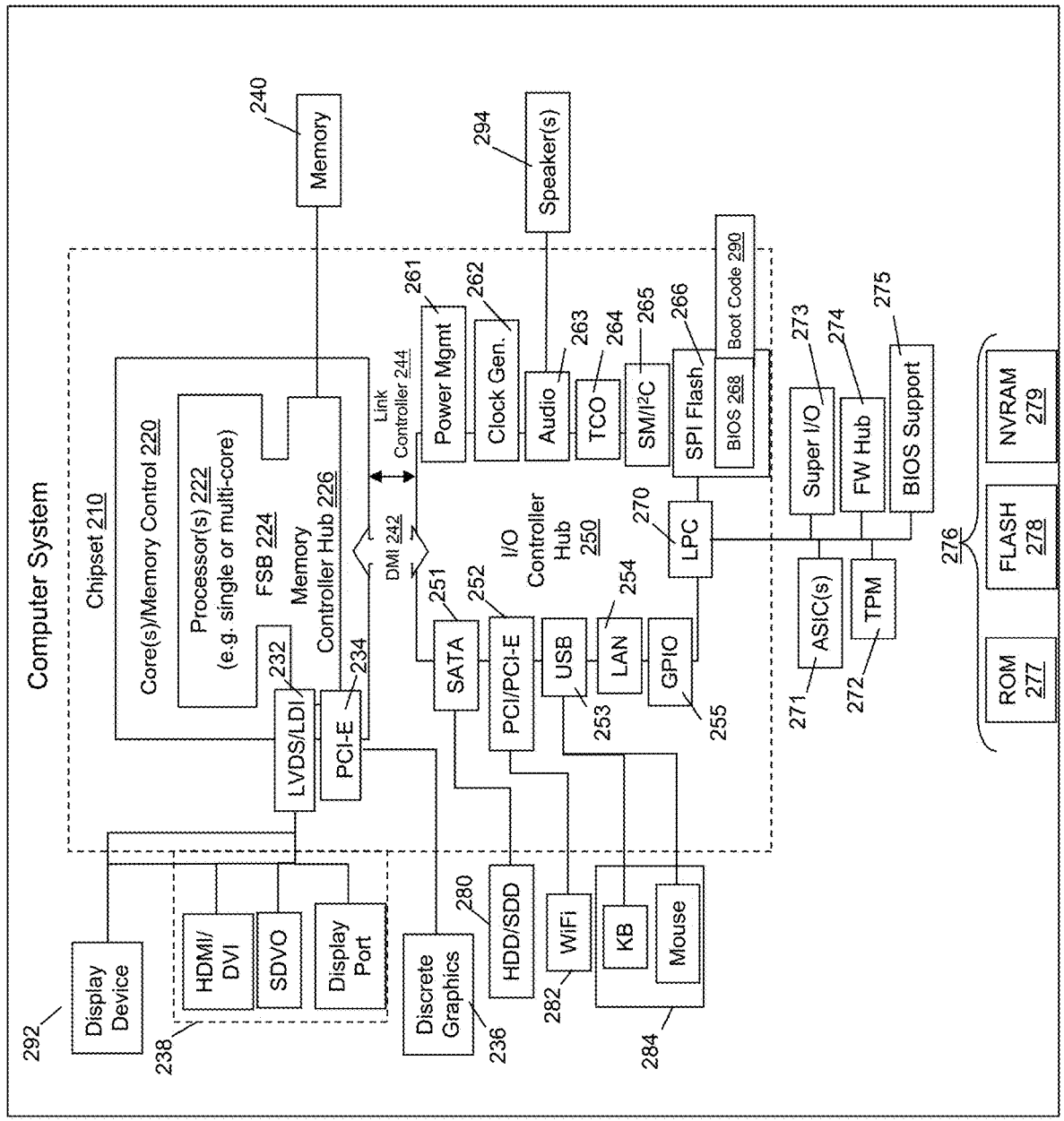
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAIVI 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of utilizing the functionality provided by two or more display devices. For example, the circuitry outlined in FIG. 1 may be implemented in a tablet or smart phone embodiment, whereas the circuitry outlined in FIG. 2 may be implemented in a laptop.

Figure 3:
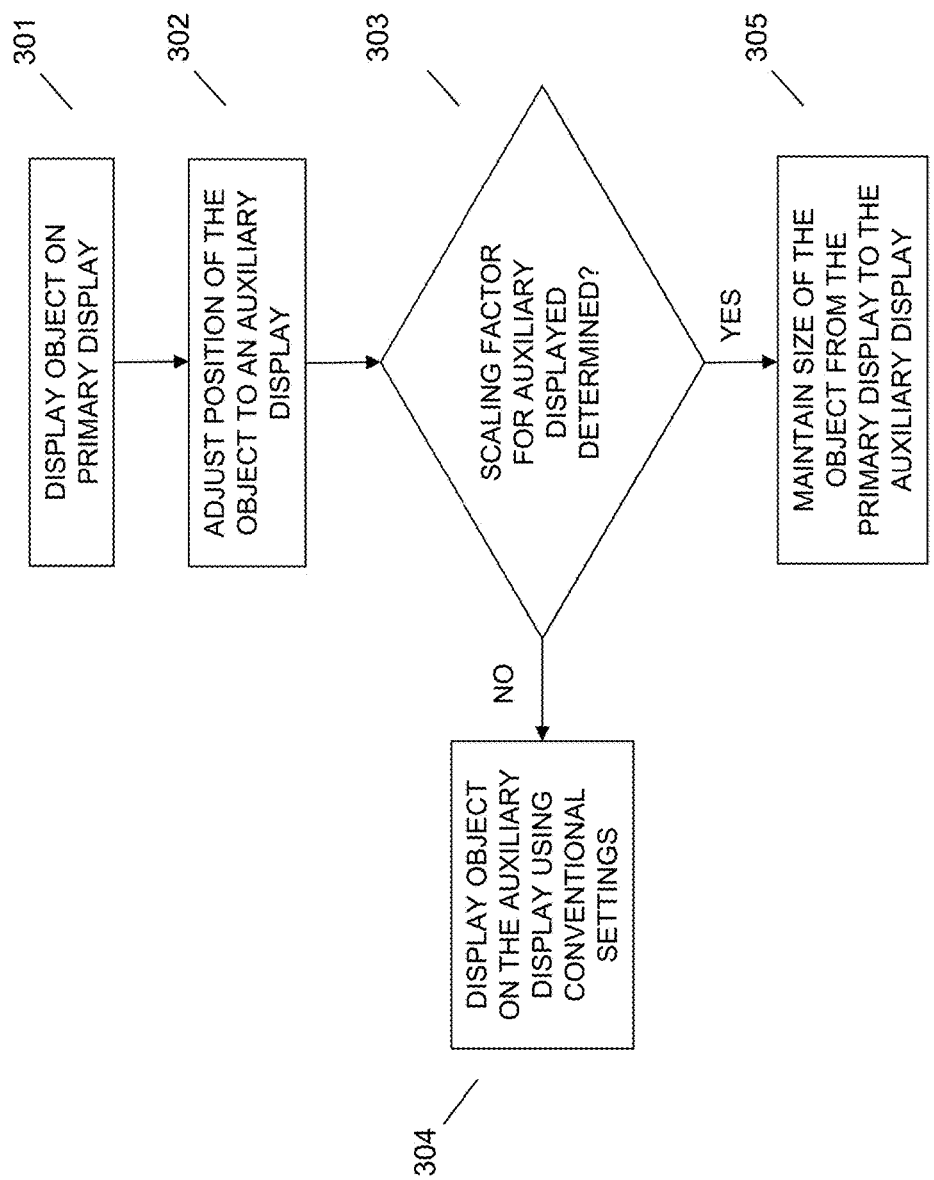
FIG. 3 illustrates an example method of maintaining the size of transferred content across display screens.

Referring now to FIG. 3, an embodiment may dynamically implement a scaling factor on an auxiliary display associated with a device to match the scaling of an object displayed on a primary display of the device. At 301, an embodiment may display an object on a primary display of a device. In the context of this application, a primary display may refer to a display that is explicitly designated as a primary display (e.g., by a manufacturer, a user, etc.), a display that is integrated into the device, a display that is positioned at a particular portion of the device (e.g., a B cover of a laptop, etc.) or comprises particular characteristics (e.g., a particular size and/or shape, etc.), one or more of the foregoing, and the like.

In an embodiment, the object displayed on the primary display may be virtually any type of object that may be displayed on a display screen (e.g., an application window, an icon, a cursor, a text box, etc.). In an embodiment, the object may comprise predetermined dimensions (e.g., an existing size and shape, etc.) and its position may also be movable by a user.

Figure 4:
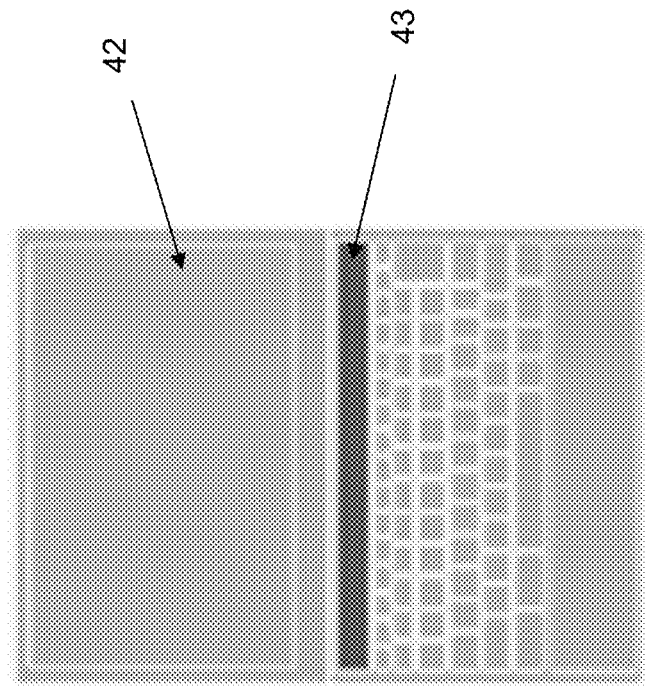
FIG. 4 provides an example illustration of a device comprising a primary display and an auxiliary display.

At 302, the position of the object may be adjusted from the primary display to an auxiliary display. In the context of this application, an auxiliary display may refer to one or more secondary display devices that may be operatively or integrally coupled to the device and that may display content transferred from the primary display. In this regard, the underlying embodiments may be applicable to a variety of different types of dual or multi-display systems. For example, the underlying embodiments may be applicable to systems utilizing two or more separate devices such as a conventional dual-monitor setup or a remote casting setup. Alternatively, the underlying embodiments may be applicable to systems where two or more display screens are integrated into a single device. For example, with reference to FIG. 4, a laptop device 41 comprising an integrated primary display 42 and an integrated auxiliary display 43 is illustrated.

For simplicity purposes, the remaining discussion herein will be described with reference to a single auxiliary display. However, such a designation is not limiting and persons skilled in the art will recognize that multiple auxiliary displays may utilize the benefits obtained from the underlying embodiments.

In an embodiment, the primary display may comprise different physical dimensions (e.g., size, shape, etc.) than the auxiliary display. Additionally or alternatively, the primary display may also have a different screen resolution than the auxiliary display. Additionally or alternatively, in the case where the primary and auxiliary displays are integrated into the device, each display may occupy a different part, or component, of the device. For example, with reference to FIG. 4, the auxiliary display 43 is positioned at a top end of a base portion of the laptop device 41 whereas the primary display 42 occupies substantially all of the B cover of the laptop device 41. Additionally, as can be seen from the illustration, the two integrated displays have different proportions. More particularly, although the auxiliary display 43 may comprise substantially the same length as the primary display 42, it has a much smaller height, or length. In an embodiment, the object originally displayed on the primary display may be moved to the auxiliary display. The movement may be facilitated by receipt of user adjustment input (e.g., using dragging input, user casting or beaming input, etc.).

At 303, an embodiment may determine a scaling factor to be implemented on the auxiliary display. In an embodiment, the scaling factor of the auxiliary display may be determined by the following equation:

$$\frac{(\text{Main Display Windows Scaling Factor}) \times (\text{Pixel Per Inch }(PPI)\text{ of Auxiliary Display})}{(PPI\text{ of Main Display})}$$

The calculated scaling factor may thereafter be communicated to a driver or application running the auxiliary display. An embodiment may identify the other values of the equation by accessing a data store (e.g., stored locally on the device or stored remotely on another device or server, etc.). More particularly, the data store may comprise values associated with the dimensions and resolution of each display (e.g., provided to the data store by the manufacturer, etc.) and may obtain the current scaling factor for the main display from one or more applications. In an embodiment, the determination of the scaling factor may be conducted when an object is moved from the primary display to the auxiliary display. Alternatively, an embodiment may determine the scaling factor each time a scaling is detected to the main display.

Responsive to not identifying, at 303, an auxiliary display scaling factor, an embodiment may, at 304, display the transferred object on the auxiliary display using conventional/existing display settings. Additionally or alternatively, an embodiment may present the user with an error message that the scaling factor for the auxiliary display could not be determined. Conversely, responsive to identifying, at 303, the auxiliary display scaling factor, an embodiment may, at 304, maintain some or all of the physical dimensions of the object when the object is moved from the primary display to the auxiliary display.

In an embodiment, the scaling factor of the auxiliary display may be automatically adjusted when the scaling of the main display is adjusted. For example, if the scaling on the primary display is adjusted (e.g., from 1× to 1.5×, 1× to 2×, etc.), then the auxiliary display would be automatically scaled to whatever ratio would produce the same physical appearance on the auxiliary display as compared to the primary display. Accordingly, this pre-emptive and automatic scaling may allow a transferred object to preserve its physical dimensions and appear visually across display devices when transferred.

The foregoing embodiments may be applicable to the transfer of two or more objects. Stated differently, if two or more objects are transferred between display devices (e.g., one after another, both simultaneously, etc.) then each of the transferred objects may maintain their physical appearance. In an embodiment, if the auxiliary display is unable to preserve the physical dimensions of each object (e.g., as a result of overlap of the objects on the auxiliary display, etc.), an embodiment may preserve the dimensions of only some of the transferred objects. More particularly, an embodiment may have access to a priority list in which a plurality of different objects each has a priority designation attached. An embodiment may then identify the higher prioritized object and preserve its dimensions while resizing the other object(s).

In certain situations, a user may not want transferred content to preserve the physical properties of the origin screen. In these situations, an embodiment may allow a user to deactivate the automatic scaling feature by interacting with a menu setting (e.g., via a toggle function, etc.).

The various embodiments described herein thus represent a technical improvement to conventional content transfer techniques. Using the techniques described herein, an embodiment may display an object on a primary display associated with a device. An embodiment may then adjust a position of the object to an auxiliary display associated with the device. The primary display and the auxiliary display may be either integrally or operatively coupled to the device. An embodiment may then maintain the size of the object based upon a scaling factor applied to the auxiliary display.

Such a method may allow an article of content transferred between display screens to preserve its physical dimensions from one display screen to another. Consequently, such a method negates the existing requirement for users to manually try to match the dimensions of the content on the destination screen to the origin screen.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    displaying, on a primary display of an information handling device, an object having a predetermined size;
    adjusting, based on user input, a position of the object from the primary display to an auxiliary display, wherein the adjusting comprises removing the object from primary display and presenting the object on the auxiliary display; and
    maintaining, based on a scaling factor applied to the auxiliary display, the predetermined size of the object on the auxiliary display;
    wherein the auxiliary display is integrated into the information handling device and wherein the auxiliary display comprises at least one of: different physical dimensions than the primary display and a different resolution than the primary display.

2. The method of claim 1, wherein the scaling factor is automatically adjusted responsive a change in the scaling of the primary display.

3. The method of claim 1, wherein the auxiliary display is located on a different portion of the information handling device than the primary display.

4. The method of claim 3, wherein the different portion is associated with a base portion comprising a keyboard.

5. The method of claim 1, wherein the auxiliary display is located on another display device operatively coupled to the information handling device.

6. The method of claim 1, wherein the object comprises at least two objects.

7. The method of claim 6, wherein the maintaining comprises maintaining the predetermined sizes for each of the at least two objects on the auxiliary display.

8. The method of claim 1, further comprising disabling, based on selection of a user option, the scaling factor.

9. An information handling device, comprising:
    a primary display;
    an auxiliary display;
    a processor;
    a memory device that stores instructions executable by the processor to:
    display, on the primary display, an object having a predetermined size;
    adjust, based on user input, a position of the object from the primary display to the auxiliary display, wherein the adjusting comprises removing the object from primary display and presenting the object on the auxiliary display; and maintain, based on a scaling factor applied to the auxiliary display, the predetermined size of the object on the auxiliary display;

wherein the auxiliary display is integrated into the information handling device and wherein the auxiliary display comprises at least one of: different physical dimensions than the primary display and a different resolution than the primary display.

10. The information handling device of claim 9, wherein the scaling factor is automatically adjusted responsive to a change in the scaling of the primary display.

11. The information handling device of claim 9, wherein the auxiliary display is located on a different portion of the information handling device than the primary display.

12. The information handling device of claim 9, wherein the auxiliary display is located on another display device.

13. The information handling device of claim 9, wherein the object comprises at least two objects.

14. The information handling device of claim 13, wherein the instructions executable by the processor to maintain comprise instructions executable by the processor to maintain the predetermined sizes for each of the at least two objects on the auxiliary display.

15. The information handling device of claim 9, wherein the instructions are further executable by the processor to disable, based on selection of a user option, the scaling factor.

16. A product, comprising:

a non-transitory storage device that stores code, the code being executable by a processor and comprising:

code that displays, on a primary display, an object having a predetermined size;

code that adjusts, based on user input, a position of the object from the primary display to an auxiliary display, wherein the adjusting comprises removing the object from primary display and presenting the object on the auxiliary display; and code that maintains, based on a scaling factor applied to the auxiliary display, the predetermined size of the object on the auxiliary display;

wherein the auxiliary display is integrated into the information handling device and wherein the auxiliary display comprises at least one of: different physical dimensions than the primary display and a different resolution than the primary display.

* * * * *